(12) United States Patent
Park et al.

(10) Patent No.: US 7,749,289 B2
(45) Date of Patent: Jul. 6, 2010

(54) FUEL CELL SYSTEM, REFORMER USED FOR THE SAME, AND METHOD OF MANUFACTURING THE SAME

(75) Inventors: Zin Park, Suwon-si (KR); Ju-Yong Kim, Suwon-si (KR); Hyun-Jeong Lim, Suwon-si (KR); Ji-Seong Han, Suwon-si (KR); Ho-Jin Kweon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 661 days.

(21) Appl. No.: 11/165,154

(22) Filed: Jun. 22, 2005

(65) Prior Publication Data

US 2006/0008398 A1 Jan. 12, 2006

(30) Foreign Application Priority Data

Jun. 29, 2004 (KR) ............. 10-2004-0049292
Jun. 29, 2004 (KR) ............. 10-2004-0049293

(51) Int. Cl.
*B01J 10/00* (2006.01)
(52) U.S. Cl. .................................. 48/61; 422/189
(58) Field of Classification Search .......... 422/188–196
See application file for complete search history.

(56) References Cited

U.S. PATENT DOCUMENTS

2003/0096147 A1* 5/2003 Badding et al. ............... 429/30
2003/0159354 A1* 8/2003 Edlund et al. .............. 48/127.9
2004/0018129 A1* 1/2004 Kawamura et al. .......... 422/211
2004/0025784 A1* 2/2004 Kawamura et al. .......... 117/200
2004/0148859 A1* 8/2004 Kawamura et al. ......... 48/127.9

FOREIGN PATENT DOCUMENTS

| JP | 04-181658 | 6/1992 |
|---|---|---|
| JP | 06-223848 | 8/1994 |
| JP | 2002-198078 | 7/2002 |
| JP | 2002-226202 | 8/2002 |
| WO | WO 2004/031088 A1 | 4/2004 |

\* cited by examiner

*Primary Examiner*—Alexa D Neckel
*Assistant Examiner*—Imran Akram
(74) *Attorney, Agent, or Firm*—Christie, Parker & Hale, LLP

(57) ABSTRACT

A fuel cell system includes: a reformer for generating hydrogen from hydrogen-containing fuel; at least one electricity generator for generating electric energy through an electrochemical reaction of hydrogen and oxygen; a fuel supply unit for supplying the fuel to the reformer; and an oxygen supply unit for supplying the oxygen to the reformer and the at least one electricity generator. The reformer includes: a plurality of reaction sections, wherein at least one of the reaction sections has a channel; at least one cover plate; and a bonding joint between two of the reaction sections and between the at least one of the reaction sections and the at least one cover plate to couple the at least one of the reaction sections and the at least one cover plate to each other.

19 Claims, 11 Drawing Sheets ing point lower than that of a material constituting the reaction plates and the at least one cover plate. The metal constituting the bonding joint may include a material selected from the group consisting of copper, stainless steel, aluminum, nickel, iron, and alloys thereof.
FUEL CELL SYSTEM, REFORMER USED FOR THE SAME, AND METHOD OF MANUFACTURING THE SAME

CROSS-REFERENCE TO RELATED APPLICATION

This application claims priority to and the benefit of Korean Patent Application Nos. 10-2004-0049292, filed on Jun. 29, 2004, and 10-2004-0049293, filed on Jun. 29, 2004, both applications filed in the Korean Intellectual Property Office, the entire contents of all of which are incorporated herein by reference.

FIELD OF THE INVENTION

The present invention relates to a fuel cell system and more particularly to a coupled structure of a plate type reformer used for a fuel cell system.

BACKGROUND OF THE INVENTION

As is well known, a fuel cell is an electricity generating system that directly converts chemical reaction energy of oxygen and hydrogen contained in hydrocarbon materials such as methanol, ethanol, or natural gas into electric energy.

A polymer electrolyte membrane fuel cell (hereinafter, referred to as PEMFC) has been developed recently which has excellent output characteristics, low operating temperatures, and fast starting and response characteristics. PEMFCs have a wide range of application, including mobile power sources for vehicles, distributed power sources for homes or buildings, and small-size power sources for electronic apparatuses.

A fuel cell system employing the PEMFC scheme includes a stack, a reformer, a fuel tank, and a fuel pump. The stack constitutes a main body of a fuel cell and the fuel pump supplies a fuel stored in the fuel tank to the reformer. Then, the reformer reforms the fuel to generate hydrogen and supplies hydrogen to the stack, which generates electric energy through an electrochemical reaction between the hydrogen and oxygen.

The reformer is a device for generating hydrogen from the fuel containing hydrogen through a catalytic chemical reaction using thermal energy. Generally, the reformer includes a heat source for generating the thermal energy, a reforming reactor for generating the hydrogen gas from the fuel using the thermal energy, and a carbon-monoxide remover for reducing the concentration of carbon monoxide contained in the hydrogen gas.

In a conventional reformer of a fuel cell system, the heat source, the reforming reactor, and the carbon-monoxide remover are each formed in a vessel shape and are connected and separated through pipes. Accordingly, it is difficult to compactly embody the fuel cell system and to rapidly deliver the thermal energy generated from the heat source to the reforming reactor, thereby deteriorating reaction efficiency and thermal efficiency of the entire fuel cell system.

SUMMARY OF THE INVENTION

An embodiment of the present invention provides a fuel cell system having a coupled structure to embody a compact reformer.

One embodiment of the present invention provides a reformer of a fuel cell system. The reformer includes: a plurality of reaction sections, wherein at least one of the reaction sections has a channel; at least one cover plate; and a bonding joint between two of the reaction sections and between the at least one reaction section and the at least one cover plate to couple the at least one reaction section and the at least one cover plate to each other.

Each of the reaction sections may have a reaction plate having a channel which formed in each of the reaction plates, and a catalyst layer formed in the channel of each of the reaction plates.

Here, the bonding joint may be formed of brazed metal. The bonding joint may be formed in contact portions between the reaction plates and contact portions between the at least one reaction plate and the at least one cover plate to bond the at least one reaction plate and the at least one cover plate to each other.

The metal constituting the bonding joint may have a melt-

The bonding joint may be made of a sealing material.

The bonding joint may be formed in contact portions between the reaction plates and contact portions between the at least one reaction plate and the at least one cover plate. Alternatively, the bonding joint may be formed on edges of the reaction plates and edges of the cover plate. In the latter case, a gasket having an opening corresponding to the channel may be disposed between the reaction plates and/or between the at least one reaction plate and the at least one cover plate. The gasket may be made of Teflon®, metal, or combinations thereof.

The reaction sections may include: a heat source for generating thermal energy through an oxidation catalytic reaction of a fuel and air; and a reforming reactor which is supplied with the fuel independent of the heat source and which absorbs the thermal energy from the heat source to generate hydrogen gas. The reforming reactor and the cover plate may be respectively stacked on the heat source, or the cover plate may include a plurality of cover plates and wherein each of the cover plates may be respectively stacked on each reaction section. The reaction sections may further include a carbon-monoxide reducer for reducing a concentration of carbon monoxide contained in the hydrogen gas.

One embodiment of the present invention provides a method of manufacturing a reformer of a fuel cell system. The method includes: preparing a plurality of reaction sections in which a channel is formed in at least one of the reaction sections and at least one cover plate; loading at least one metal film having an opening corresponding to the channel between the at least one reaction section and the at least one cover plate; heating the at least one reaction section and the at least one cover plate in a state when the at least one reaction section and the at least one cover plate contact each other; and melting the at least one metal film to braze the at least one reaction section with the at least one cover plate.

The at least one metal film may be made of a material selected from the group consisting of copper, stainless steel, aluminum, nickel, iron, and alloys thereof.

Each reaction section may have a reaction plate made of a material selected from the group consisting of stainless steel, aluminum, nickel, iron, and combinations thereof, and the at least one cover plate may be made of a material selected from the group consisting of stainless steel, aluminum, nickel, iron, and combinations thereof.

The at least one reaction section and the at least one cover plate may be heated at a temperature from about 500° C. to 900° C. to melt the at least one metal film.

One embodiment of the present invention provides a fuel cell system. The fuel cell system includes: a reformer for generating hydrogen from a fuel containing hydrogen; at least one electricity generator for generating electric energy through an electrochemical reaction of hydrogen and oxygen; a fuel supply unit for supplying the fuel to the reformer; and an oxygen supply unit for supplying the oxygen to the reformer and the at least one electricity generator. Here, the reformer includes: a plurality of reaction sections, wherein at least one of the reaction sections has a channel; at least one cover plate contacting the at least one of the reaction sections; and a bonding joint between two of the reaction sections and between the at least one reaction section and the at least one cover plate to couple the at least one reaction section and the at least one cover plate to each other.

The bonding joint may be formed of brazed metal or may be made of a sealing material.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, exemplary embodiments of the present invention will be described in detail with reference to the attached drawings, such that the present invention can be easily put into practice by those skilled in the art. However, the present invention is not limited to the exemplary embodiments, and may be embodied in various forms.

Figure 1:
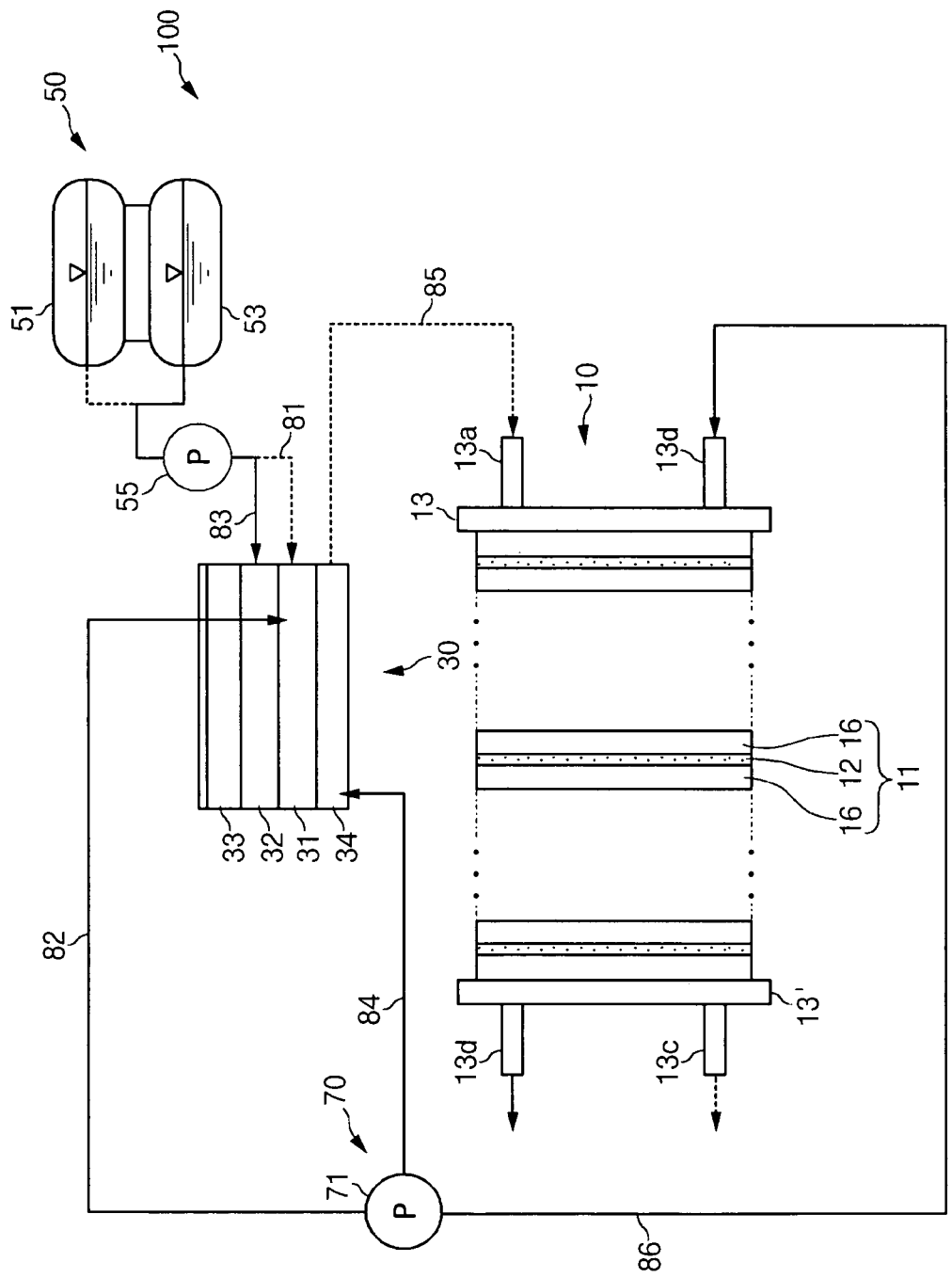
FIG. 1 is a schematic diagram illustrating an entire construction of a fuel cell system according to an embodiment of the present invention.
Figure 2:
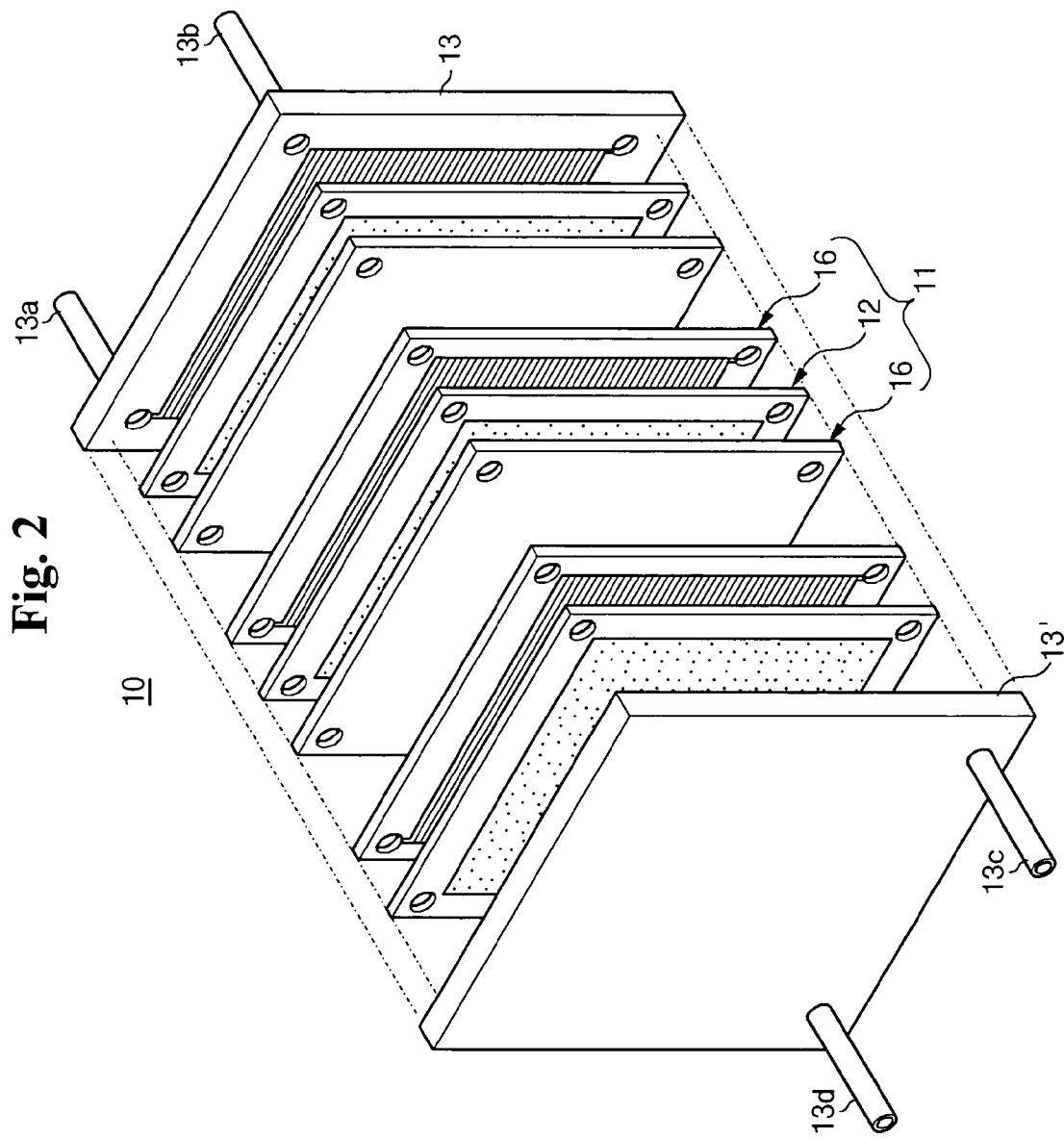
FIG. 2 is an exploded perspective view illustrating a structure of a stack shown in FIG. 1.

FIG. 1 is a schematic diagram illustrating an entire construction of a fuel cell system according to an embodiment of the present invention, and FIG. 2 is an exploded perspective view illustrating a structure of a stack shown in FIG. 1.

Referring to FIGS. 1 and 2, the fuel cell system 100 according to the present invention employs a polymer electrolyte membrane fuel cell (PEMFC) scheme which reforms a fuel containing hydrogen to generate hydrogen and allows hydrogen and oxygen to electrochemically react with each other to generate electric energy.

The fuel used to generate electricity in the fuel cell system 100 can include a liquid or gas hydrogen-containing fuel such as methanol, ethanol, or natural gas. However, liquid fuel is exemplified in the following description.

The fuel cell system 100 may utilize pure oxygen stored in an additional storage device for reacting with hydrogen contained in the fuel or may utilize oxygen-containing air as the necessary oxygen source. However, the latter is exemplified in the following description.

Referring to FIG. 1, the fuel cell system 100 includes a stack 10 for generating electric energy through an electrochemical reaction between hydrogen and oxygen, a reformer 30 for generating hydrogen from the fuel to be supplied to the stack 10, a fuel supply unit 50 for supplying the fuel to the reformer 30, and an oxygen supply unit 70 for supplying the oxygen to the stack 10 and the reformer 30.

The stack 10 according to the present embodiment includes a plurality of electricity generators 11 that are sequentially stacked.

Each electricity generator 11 is a unit of a fuel cell for generating electricity in which separators 16 are disposed on both surfaces of a membrane-electrode assembly (MEA) 12.

The MEA 12 has a predetermined active area where the electrochemical reaction of hydrogen and oxygen occurs. The MEA 12 includes an anode electrode formed on one surface, a cathode electrode formed on the other surface, and an electrolyte membrane formed between the anode and cathode electrodes.

The anode electrode converts hydrogen into hydrogen ions (protons) and electrons through an oxidation reaction of the hydrogen. The cathode electrode generates heat and moisture with a predetermined temperature through a reduction reaction of the hydrogen ions and the oxygen. The electrolyte membrane performs an ion exchange function for moving the hydrogen ions generated from the anode electrode to the cathode electrode.

The separators 16 function as conductors for connecting the anode electrode and the cathode electrode in series to each other, and also function as passages for supplying the hydrogen and the air containing oxygen to both sides of the MEA 12.

The outermost sides of the stack 10 may be provided with additional pressing plates 13 and 13' for bringing the electricity generators 11 into close contact with each other. The stack 10 according to the present invention may be constructed such that the separators 16 located at the outermost sides of the plurality of electricity generators 11 carry out the function as the pressing plates 13 and 13', without providing the pressing plates 13 and 13'. Alternatively, the stack 10 may be constructed such that the pressing plates 13 and 13' have a function specific to the separators 16, in addition to the function of bringing the plurality of electricity generators 11 into close contact with each other.

One pressing plate 13 is provided with a first injection hole 13a for supplying the hydrogen gas to the electricity generators 11 and a second injection hole 13b for supplying the air to the electricity generators. The other pressing plate 13' is provided with a first discharge hole 13c for discharging the non-reacted hydrogen gas in the electricity generators 11 and a second discharge hole 13d for discharging the non-reacted air and the moisture generated through the coupling reaction between hydrogen and oxygen in the electricity generators 11.

In the present embodiment, the reformer 30 has a structure for generating the hydrogen gas from the fuel containing hydrogen through a catalytic chemical reaction using thermal energy and reduces the concentration of carbon monoxide contained in the hydrogen gas. The structure of the reformer 30 will be described later in more detail with reference to FIGS. 3 and 4.

The fuel supply unit 50 for supplying the fuel to the reformer 30 includes a first tank 51 for storing the liquid fuel, a second tank 53 for storing water, and a fuel pump 55 connected to the first and second tanks 51 and 53. The oxygen supply unit 70 includes an air pump 71 for drawing air from the atmosphere air with a predetermined pumping power and supplying that air to the reformer 30.

Now, the structure of the reformer 30 according to a first embodiment of the present invention is described in more detail with reference to FIGS. 3 and 4.

Figure 3:
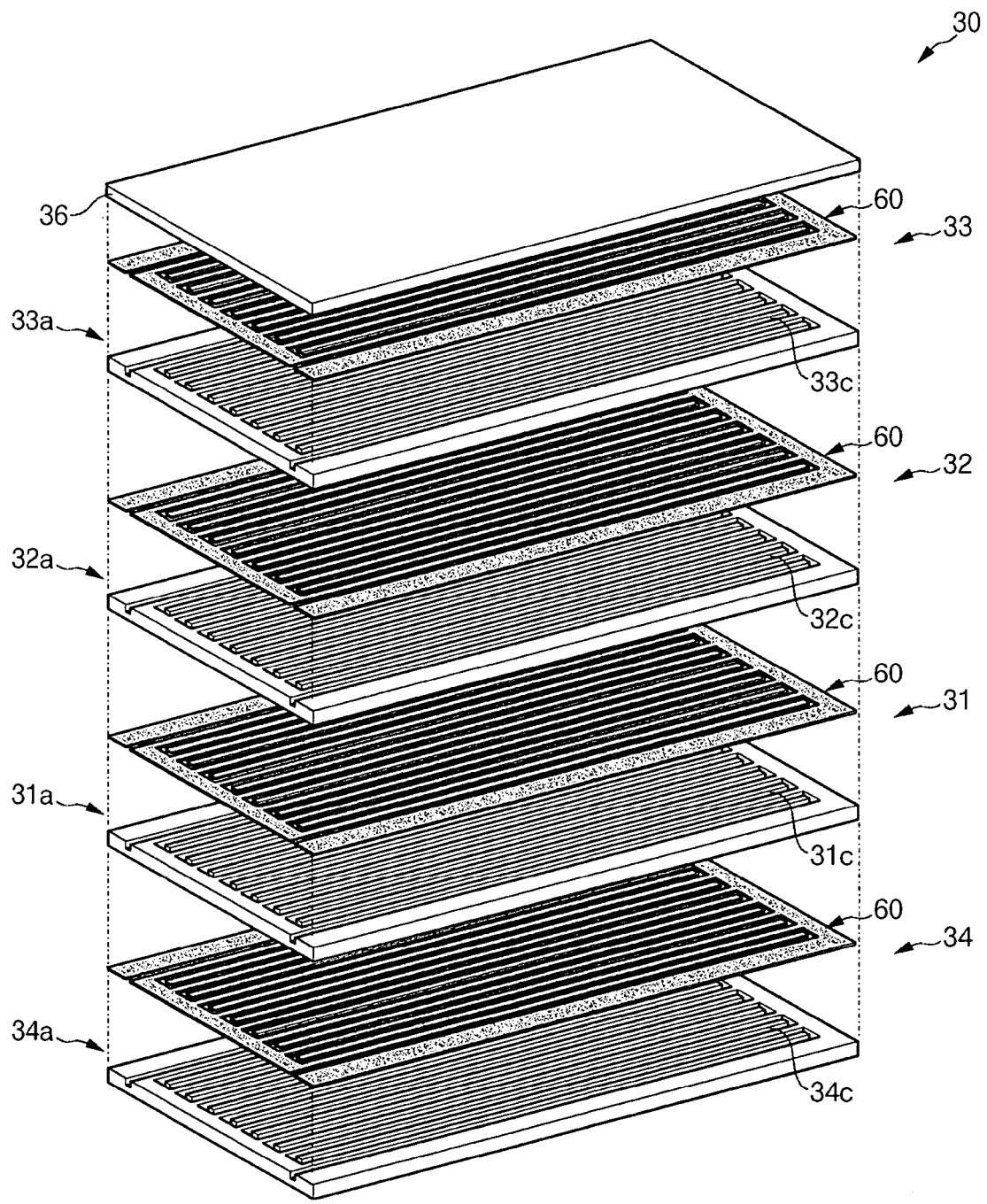
FIG. 3 is an exploded perspective view illustrating a structure of a reformer according to a first embodiment of the present invention.
Figure 4:
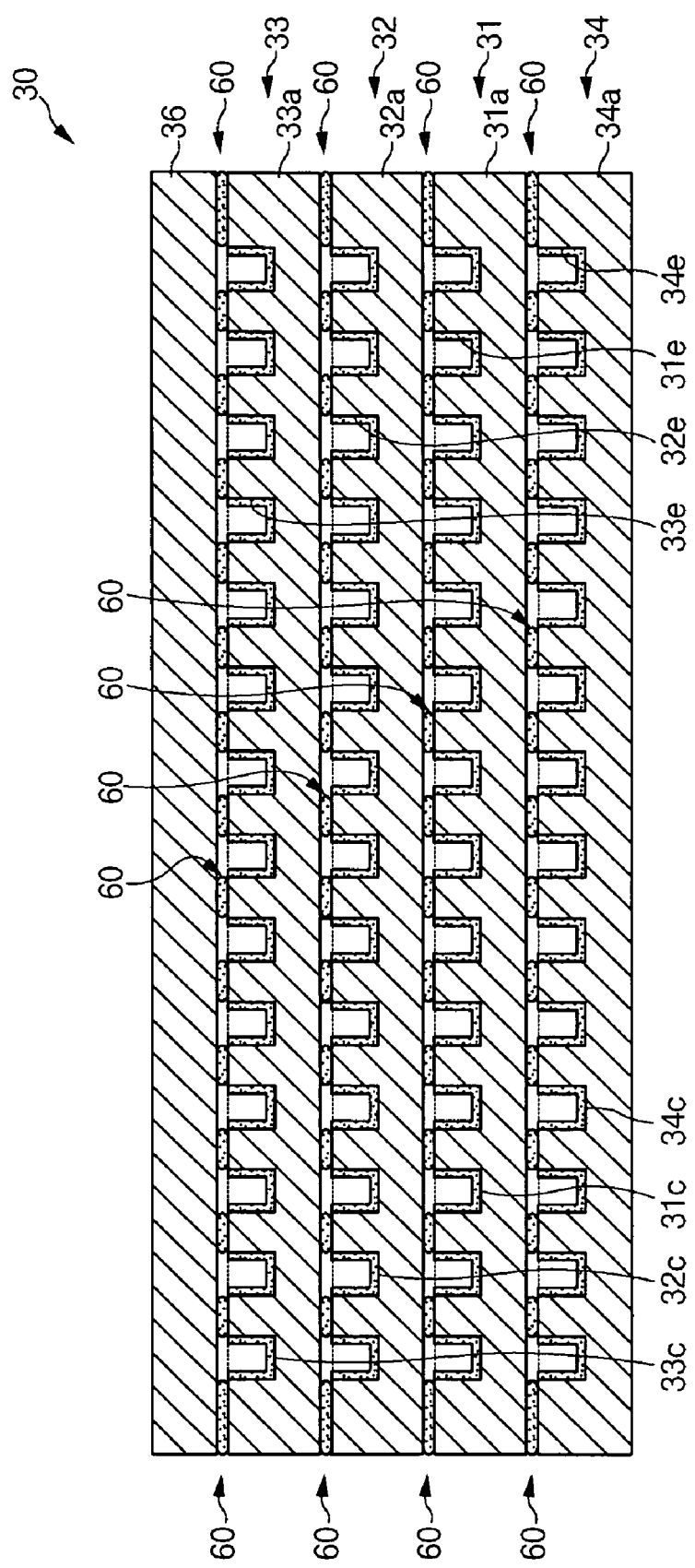
FIG. 4 is a cross-sectional view illustrating the coupled structure of the reformer shown in FIG. 3.

FIG. 3 is an exploded perspective view illustrating the structure of the reformer 30 according to the first embodiment of the present invention and FIG. 4 is a cross-sectional view illustrating the coupled structure of the reformer 30 shown in FIG. 3.

Referring to the FIGS. 3 and 4, the reformer 30 according to the present embodiment has a stacked structure of a plurality of reaction sections 31, 32, 33, and 34 which generate thermal energy through an oxidation catalytic reaction of the fuel and the air, generate hydrogen gas from a mixture of the fuel and water from the first and second tanks 51 and 53 (hereinafter, referred to as a fuel mixture) through various catalytic reactions using the thermal energy, and reduce the concentration of carbon monoxide contained in the hydrogen gas.

In particular, the reformer 30 includes a heat source 31 for generating the thermal energy; a reforming reactor 32 for absorbing the thermal energy, vaporizing the fuel mixture, and generating the hydrogen gas from the vaporized fuel mixture through a steam reforming (SR) catalytic reaction; a first carbon-monoxide reducer 33 for primarily reducing the concentration of carbon monoxide contained in the hydrogen gas through a water-gas shift (WGS) catalytic reaction of the hydrogen gas; and a second carbon-monoxide reducer 34 for secondarily reducing the concentration of carbon monoxide contained in the hydrogen gas through a preferential CO oxidation (PROX) catalytic reaction of the hydrogen gas and the air.

According to the present embodiment, the reformer 30 has such a structure in which the reforming reactor 32 and the first carbon-monoxide reducer 33 are sequentially stacked on or above the heat source 31 and the second carbon-monoxide reducer 34 is stacked under or below the heat source 31. A cover plate 36 may be coupled on the first carbon-monoxide reducer part 33 and located at the uppermost side of the reformer 30. Each of a plurality of bonding joints 60 is disposed between two of the reaction sections 31, 32, 33, and 34 and cover plate 36. The bonding joints 60 will be described in more detail below.

Each of the reaction sections 31, 32, 33 and 34 can include a reaction plate which has a rectangular plate shape with a predetermined width and a predetermined length and which is made of a metal selected from aluminum, stainless steel, copper, nickel, iron, and combinations thereof.

Now, the reaction sections 31, 32, 33 and 34 are described in more detail.

The heat source 31 is a heat emitting element for generating the thermal energy necessary to preheat the entire reformer 30 for the reformation of a fuel by combusting the fuel and the air through an oxidation catalytic reaction.

The heat source part 31 includes a first reaction plate 31a, in which a first channel 31c for enabling the flow of the liquid fuel and the air is formed, and an oxidation catalyst layer 31e for promoting the oxidation reaction of the fuel and the air is formed on inner surfaces of the first channel 31c. The first channel 31c is formed by disposing flow channels with a predetermined gap between adjacent flow channels on the first reaction plate 31a and alternately connecting the ends of the flow channels to define a serpentine channel. Second, third, and fourth channels 32c, 33c, and 34c to be described in more detail below may have the same shape.

The reforming reactor 32 absorbs the thermal energy generated from the heat source 31 and generates the hydrogen gas from the fuel mixture through the reforming catalytic reaction of the fuel supplied from the fuel supply unit 50.

The reforming reactor 32 includes a second reaction plate 32a, in which a second channel 32c for enabling the flow of the fuel is formed, and a steam reforming catalyst layer 32e for promoting the steam reforming reaction of the fuel mixture is formed on inner surfaces of the second channel 32c.

The first carbon-monoxide reducer 33 generates additional hydrogen through the water-gas shift catalytic reaction of the hydrogen gas generated from the reforming reactor 32 to reduce the concentration of carbon monoxide contained in the hydrogen gas.

The first carbon-monoxide reducer 33 includes a third reaction plate 33a, in which a third channel 33c for enabling the flow of the hydrogen gas is formed, and a water-gas shift catalyst layer 33e for promoting the water-gas shift reaction of the hydrogen gas is formed on inner surfaces of the third channel 33c.

The second carbon-monoxide reducer 34 reduces the concentration of carbon monoxide contained in the hydrogen gas through the preferential CO oxidation catalytic reaction of the hydrogen gas discharged from the first carbon-monoxide reducer 33 and the air supplied from the oxygen supply unit 70.

The second carbon-monoxide reducer 34 includes a fourth reaction plate 34a, in which a fourth channel 34c for enabling the flow of the hydrogen gas and the air is formed, and a preferential CO oxidation catalyst layer 34e for promoting the preferential CO oxidation reaction of the hydrogen gas is formed on inner surfaces of the fourth channel 34c.

The cover plate 36 is mounted on the first carbon-monoxide reducer 33.

Each of the plurality of bonding joints 60 is disposed between two of the reaction sections 31, 32, 33, and 34 and cover plate 36. The bonding joints 60 are for bonding and fixing the reaction sections 31, 32, 33, and 34 and the cover plate 36 to each other. The bonding joints 60 can be formed in the contact portion between the first reaction plate 31a and the second reaction plate 32a, the contact portion between the second reaction plate 32a and the third reaction plate 33a, the contact portion between the third reaction plate 33a and the cover plate 36, and the contact portion between the fourth reaction plate 34a and the first reaction plate 31a. The contact portions of the reaction plates 31a, 32a, 33a, and 34a and the cover plate 36 include the portions of the reaction plates 31a, 32a, 33a, and 34a in which the channels 31c, 32c, 33c, and 34c are not formed and which the neighboring reaction plates 31a, 32a, and 33a or the cover plate 36 come in close contact with.

In the present embodiment, the bonding joints 60 may be formed by melting metal. That is, each of the bonding joints 60 can be formed by brazing a metal film having openings corresponding to the channels 31c, 32c, 33c, and 34c.

The metal films forming the bonding joints 60 should have a melting point lower than that of the materials forming the reaction plates 31a, 32a, 33a, and 34a and the cover plate 36. That is, when forming the bonding joints 60 by heating the metal films, the reaction plates 31a, 32a, 33a, and 34a and the cover plate 36 should be closely fixed to each other through the bonding joints 60 without deforming the reaction plates 31a, 32a, 33a, and 34a and the cover plate 36.

The bonding joints 60 may be made of a material selected from the group consisting of copper, stainless steel, aluminum, nickel, iron, and alloys thereof. Here, in one embodiment, when the bonding joints 60 are made of an alloy containing the materials of the reaction plates 31a, 32a, 33a, and 34a and the cover plate 36, it is possible to prevent cracks which can be generated due to different characteristics between different kinds of metal.

In the present embodiment, the reaction plates 31a, 32a, 33a, and 34a and cover plate 36 can be firmly fixed to each other through the bonding joints 60 made of metal films.

In the reformer 30 according to the present embodiment, since the bonding joints 60 are formed by disposing one of the metal films between two of the reaction plates 31a, 32a, 33a, and 34a and cover plate 36 and then brazing the metal films, the manufacturing process of the reformer 30 is simplified, thereby improving the productivity. In addition, it is possible to improve the air-tightness between the contact portions of the reaction plates 31a, 32a, 33a, and 34a and cover plate 36 due to the bonding joints 60.

Also, in a fuel cell system according to the present invention, since a reformer is formed by stacking reaction plates having respective channels for enabling the flow of a fuel or a gas, the size of the reformer can be reduced, thereby allowing for the fuel cell system to be compact.

Operations of the fuel cell system according to an embodiment of the present invention will be described in more detail below.

First, the fuel pump 55 supplies the fuel stored in the first tank 51 to the heat source 31 through a first supply line 81. At the same time, the air pump 71 supplies the air to the heat source part 31 through a second supply line 82. Then, the fuel and the air result in the oxidation catalytic reaction with the oxidation catalyst layer 31e of the heat source 31. Accordingly, the heat source 31 generates a reaction heat with a predetermined temperature through the oxidation catalytic reaction of the fuel and the air. As a result, the thermal energy generated from the heat source 31 is delivered to the reforming reactor 32 and the first and second carbon-monoxide reducers 33 and 34 and preheats the entire reformer 30.

Next, when the preheating of the reformer 30 is completed, the fuel pump 55 supplies the fuel stored in the first tank 51 and the water stored in the second tank 53 to the reforming reactor 32 through a third supply line 83. Then, the fuel and the water are vaporized and the hydrogen gas is generated from the vaporized fuel through the steam reforming catalytic reaction with the reformation catalyst layer 32e of the reforming reactor 32. Since the reforming reactor 32 cannot completely carry out the steam reformation catalytic reaction, the reforming reactor 32 generates the hydrogen gas containing carbon monoxide as a byproduct.

Next, the hydrogen gas containing carbon monoxide is supplied to the first carbon-monoxide reducer 33. Then, the first carbon-monoxide reducer 33 generates additional hydrogen gas through the water-gas shift catalytic reaction with the water-gas shift catalyst layer 33e and primarily reduces the concentration of carbon monoxide contained in the hydrogen gas.

Subsequently, the hydrogen gas passing through the first carbon-monoxide reducer 33 is supplied to the second carbon-monoxide reducer 34. At the same time, the air pump 71 supplies the air to the second carbon-monoxide reducer 34 through a fourth supply line 84. Then, the second carbon-monoxide reducer 34 secondarily reduces the concentration of carbon monoxide contained in the hydrogen gas through the preferential CO oxidation catalytic reaction with the preferential CO oxidation catalyst layer 34e and discharges the hydrogen gas.

Subsequently, the hydrogen gas is supplied to the first injection hole 13a of the stack 10 through a fifth supply line 85. At the same time, the air pump 71 supplies the air to the second injection hole 13b of the stack 10 through a sixth supply line 86.

Then, the hydrogen gas is supplied to the anode electrode of the MEA 12 through the hydrogen passage of the passages 17 of the separators 16. The air is supplied to the cathode electrode of the MEA 12 through the air passage of the passages 17 of the separators 16.

The anode electrode decomposes the hydrogen gas into electrons and protons (hydrogen ions) through the oxidation reaction. The protons are moved to the cathode electrode through the electrolyte membrane, and the electrons are moved to the cathode electrode of the neighboring MEA 12 through the separators 16, and not through the electrolyte membrane. The flow of electrons generates a current, and heat and water are also generated by the stack 10 as byproducts.

Figure 5:
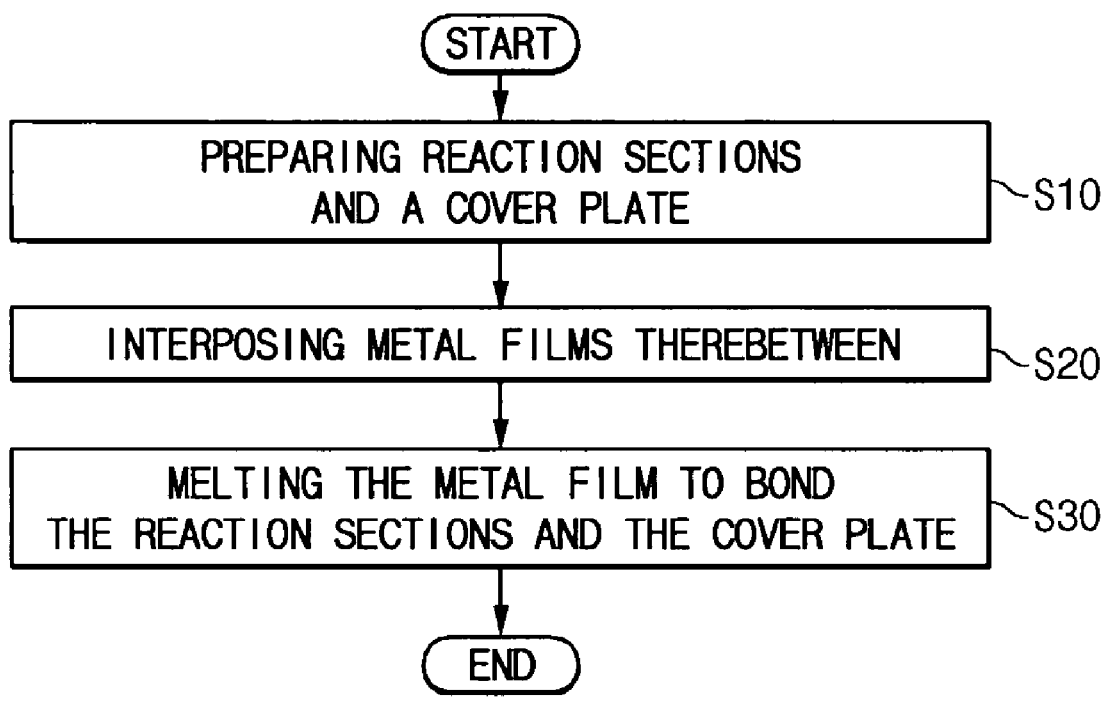
FIG. 5 is a flowchart illustrating a method of manufacturing the reformer according to the first embodiment of the present invention.

Now, a method of manufacturing the reformer 30 according to the first embodiment will be described in more detail with reference to FIG. 5.

First, the cover plate 36 and the reaction sections 31, 32, 33, and 34 having the channels 31c, 32c, 33c, and 34c in which the catalyst layers 31e, 32e, 33e, and 34e are formed are prepared (S10).

Next, the reforming reaction section 32, the first carbon-monoxide reducer 33, and the cover 36 are sequentially stacked on or above the heat source 31 and the second carbon-monoxide reducer 34 is stacked under or below the heat source 31.

In the method, the metal films having the openings corresponding to the channels 31c, 32c, 33c, and 34c are each disposed between two of the reaction sections 31, 32, 33, and 34 and cover plate 36 (S20). At this time, the metal films are positioned such that the respective channels 31c, 32c, 33c, and 34c correspond to the openings of the respective metal films.

Thereafter, in a state where the reaction sections 31, 32, 33, and 34 and the cover plate 36 are closely pressed, they are heated to a predetermined temperature, thereby melting the metal films (S30). In one embodiment, when the reaction plates 31a, 32a, 33a, and 34a of the reaction sections 31, 32, 33, and 34 and the cover plate 36 are made of stainless steel, they are heated to a temperature of about 900° C. to melt the metal films. In another embodiment, when the reaction plates 31a, 32a, 33a, and 34a and the cover plate 36 are made of aluminum, they are heated at a temperature from about 500° C. to 900° C. to melt the metal films.

When the metal films of the contact portions between the reaction sections 31, 32, 33, and 34 and the cover plate 36 are melted, the bonding joints 60 are formed at the contact portions of the reaction sections 31, 32, 33, and 34 and the contact portions of the cover plate 36. Because of the bonding joints 60, the reaction sections 31, 32, 33, and 34 and the cover plate 36 can be firmly fixed to each other.

Modified examples of the first embodiment of the present invention will be described below. In the modified examples, the elements that are substantially the same as those described for the first embodiment will not be described again.

Figure 6:
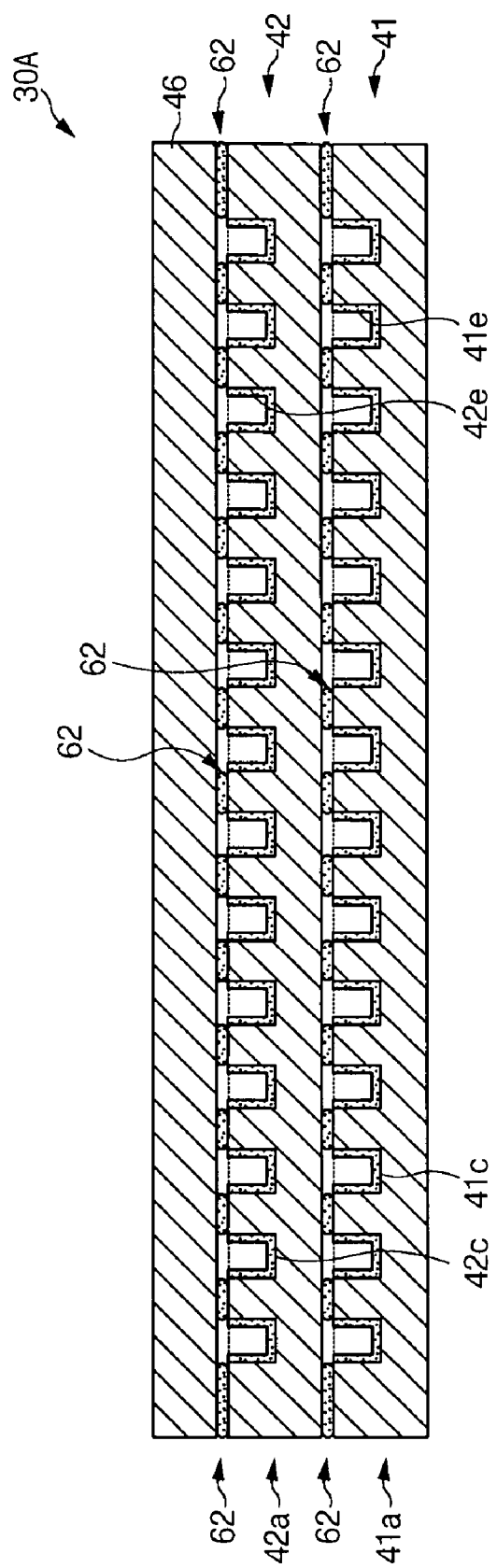
FIG. 6 is a cross-sectional view illustrating a structure of the reformer according to a first modified example of the first embodiment of the present invention.

FIG. 6 is a cross-sectional view illustrating a structure of a reformer according to a first modified example of the first embodiment of the present invention.

Referring to FIG. 6, a reformer 30A according to the present modified example includes a reforming reactor 42 and the cover plate 46 which are sequentially stacked on the heat source 41. Specifically, the reformer 30A has a structure such that a second reaction plate 42a is stacked on a first reaction plate 41a, and a cover plate 46 is stacked on the second reaction plate 42a. At this time, the first reaction plate 41a, the second reaction plate 42a, and the cover plate 46 are provided with bonding joints 62 formed of brazed metal.

That is, in the present modified example, by minimizing the number of elements and including the heat source 41 and the reforming reactor 42 necessary for the reforming reaction, it is possible to further enhance certain structural advantages of the reformer 30A.

Figure 7:
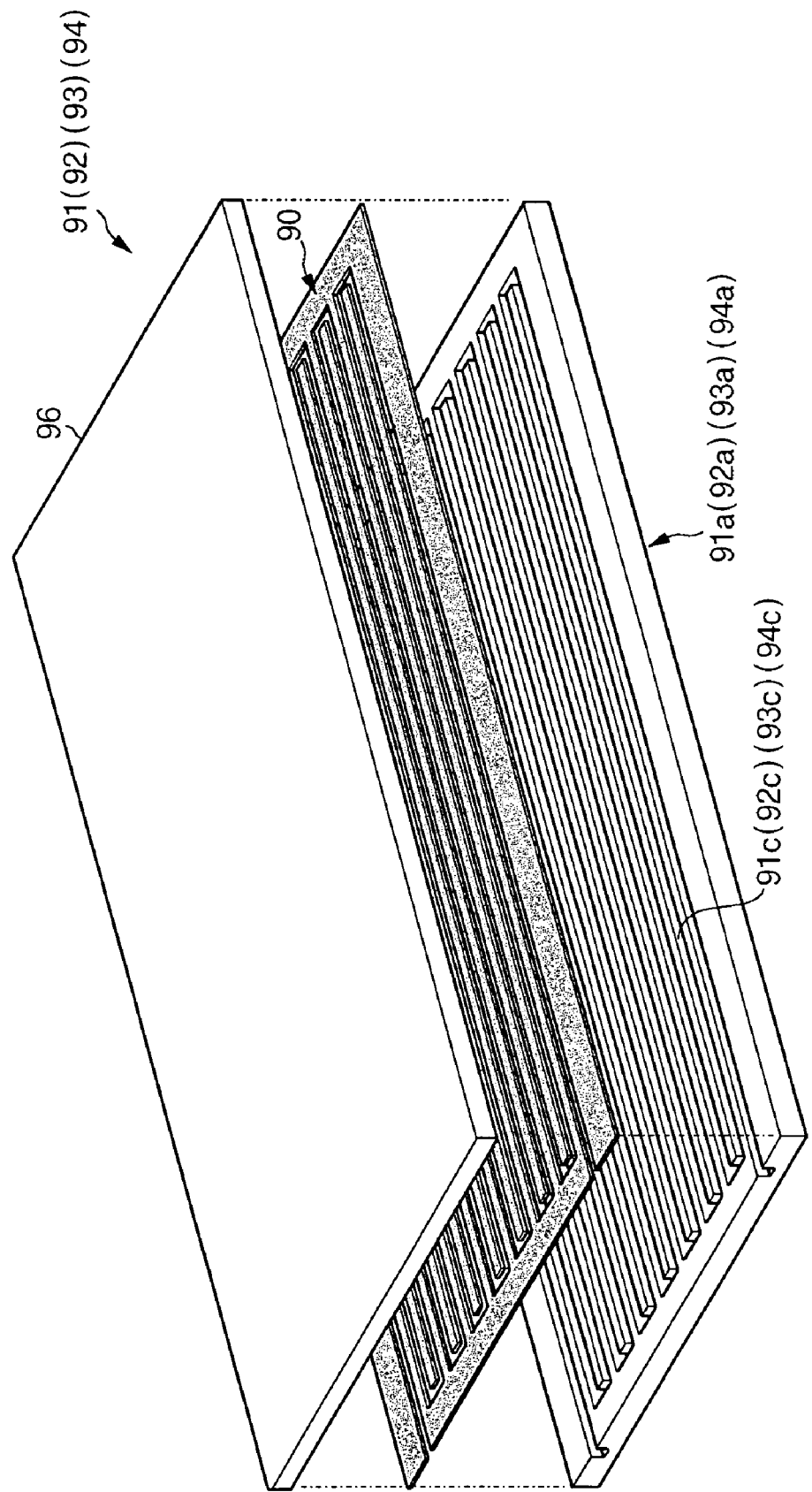
FIG. 7 is an exploded perspective view illustrating a structure of reaction sections of a reformer according to a second modified example of the first embodiment of the present invention.
Figure 8:
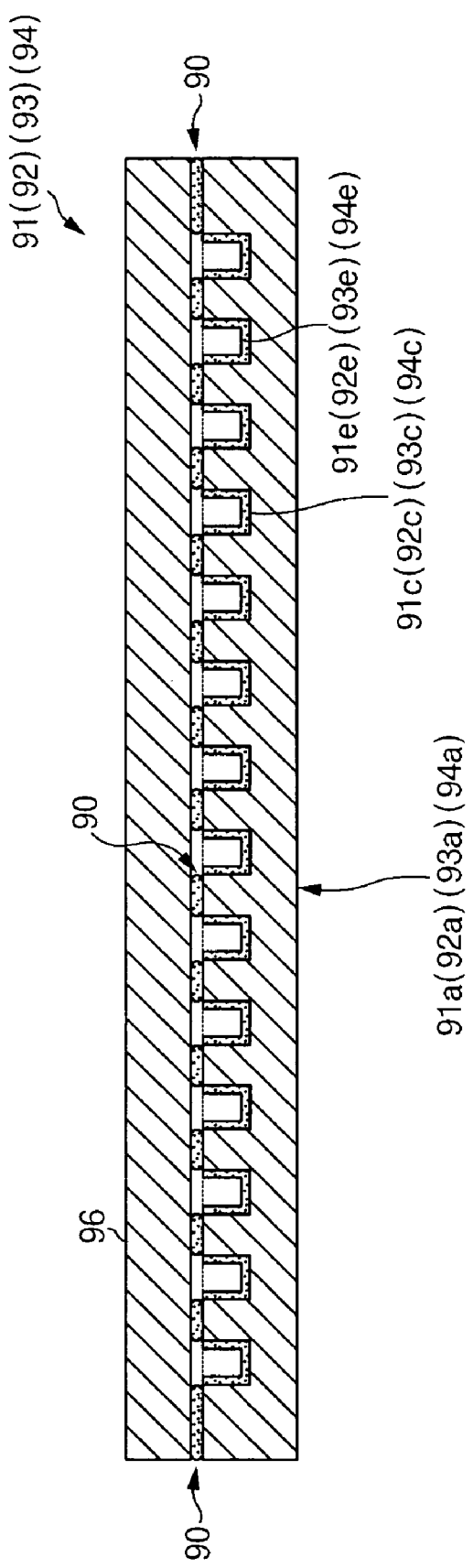
FIG. 8 is a cross-sectional view illustrating the coupled structure of the reformer shown in FIG. 7.

FIG. 7 is an exploded perspective view illustrating a structure of a reformer according to a second modified example of the present invention. FIG. 8 is a coupled cross-sectional view of the reformer shown in FIG. 7.

In the present modified example, the reformer includes a heat source 91, a reforming reactor 92, a first carbon-monoxide reducer 93, and a second carbon-monoxide reducer 94. Since the reaction sections 91, 92, 93, and 94 have the same structure except that different catalyst layers 91e, 92e, 93e, and 94e are formed therein, the reaction sections 91, 92, 93, and 94 are shown as one element in the FIG. 7.

A cover plate 96 is stacked on the respective reaction sections 91, 92, 93, and 94 and the respective reaction sections 91, 92, 93, and 94 and the cover plates 96 are bonded to each other through bonding joints 90. The bonding joints 90 can be formed of brazed metal.

The method of manufacturing the reformer according to the first and second modified examples is substantially the same as the method of manufacturing the reformer according to the first embodiment and will not be described again.

A reformer according to the present invention may not include the carbon-monoxide reducer and may further include an additional reaction section. A reformer may include a different-structured reaction section along with the above-mentioned plate-shaped reaction sections, which belongs to the scope of the present invention.

Reformers according to a second embodiment and a third embodiment of the present invention will be described below. In the embodiments, elements that are substantially the same as those described for the first embodiment will not be described again. Also, the modified examples of the first embodiment can be applied to the second embodiment.

Figure 9:
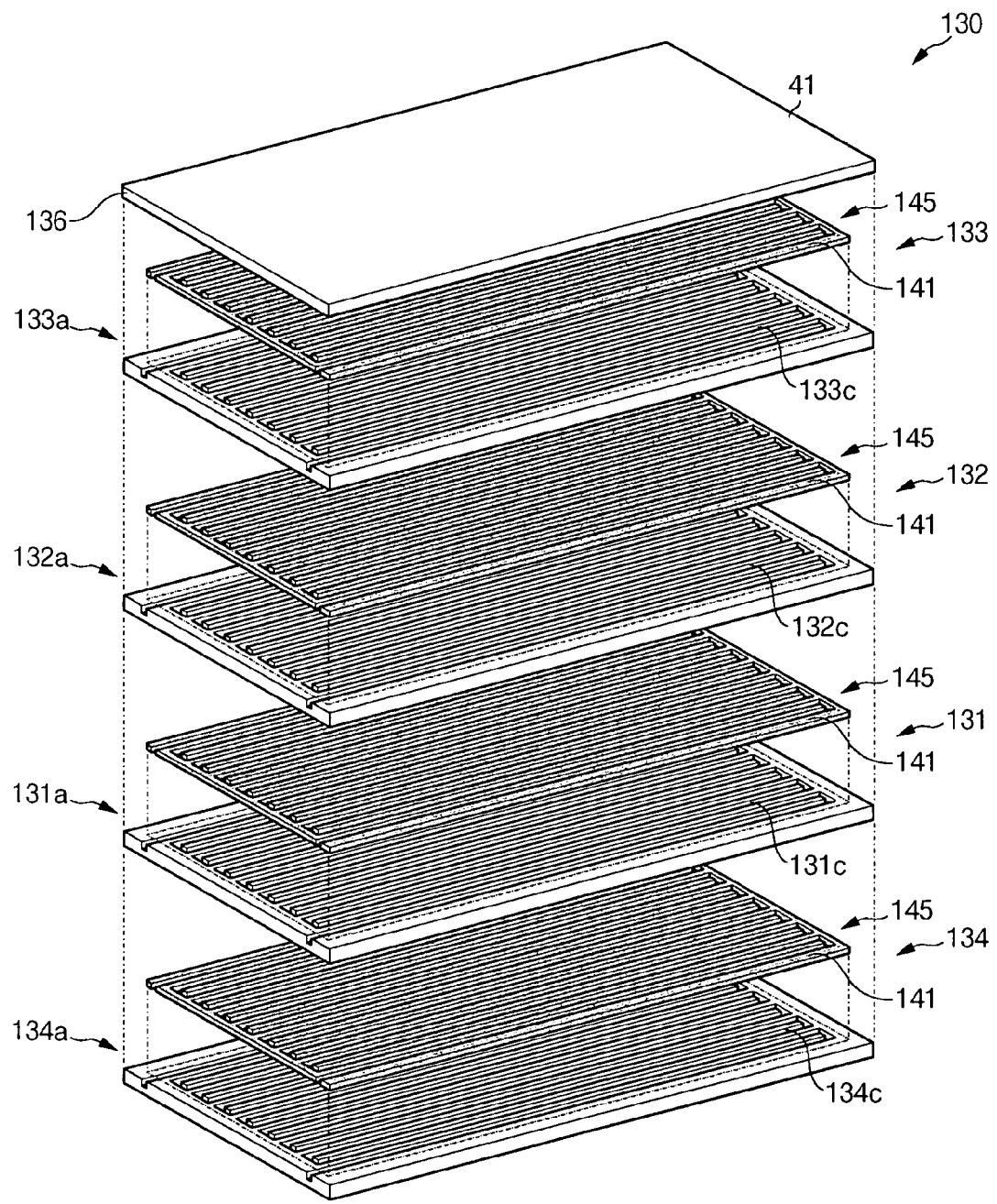
FIG. 9 is an exploded perspective view illustrating a structure of a reformer according to a second embodiment of the present invention.
Figure 10:
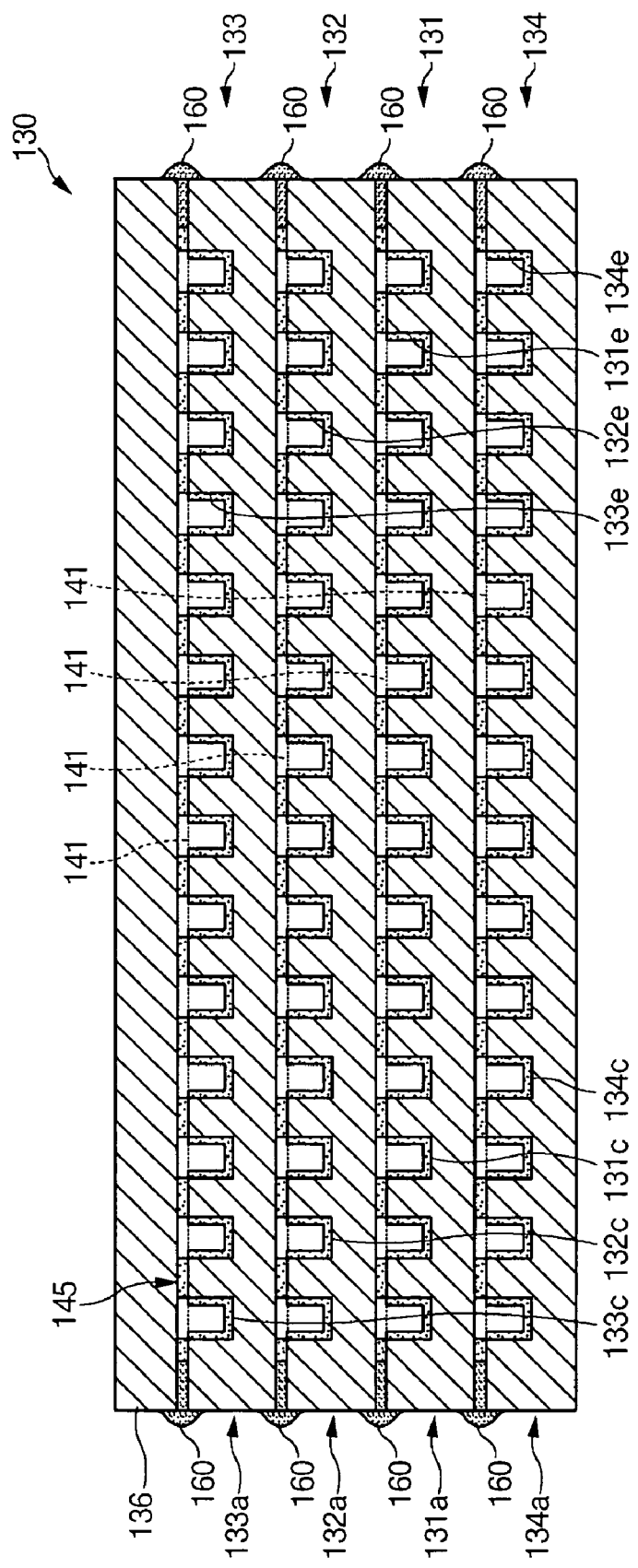
FIG. 10 is a cross-sectional view illustrating the coupled structure of the reformer shown in FIG. 9.

FIG. 9 is an exploded perspective view illustrating a structure of a reformer according to a second embodiment of the present invention. FIG. 10 is a cross-sectional view of the coupled structure of the reformer shown in FIG. 9.

Referring to FIGS. 9 and 10, the reformer 130 according to the present embodiment includes a heat source 131, a reforming reactor 132, a first carbon-monoxide reducer 133, and a second carbon-monoxide reducer 134 which are stacked with each other. Here, the reforming reactor 132 and the first carbon-monoxide reducer 133 can be sequentially stacked on the heat source 131 and the second carbon-monoxide reducer 134 can be stacked under the heat source 131.

More specifically, the reformer 130 according to the present embodiment can be constructed by sequentially stacking a second reaction plate 132a and a third reaction plate 133a on a first reaction plate 131a and then stacking a fourth reaction plate 134a under the first reaction plate 131a. A cover plate 136 can be coupled onto the third reaction plate 133a positioned at the uppermost side of the reformer 130.

Bonding joints 160 which bond the respective reaction plates 131a, 132a, 133a, and 134a and cover plate 136 to each other are made of a sealing material for bonding the edges thereof. Here, the sealing material may be composed of a glass frit.

Gaskets 145 in which openings 141 are formed to correspond to channels 131c, 132c, 133c, and 134c are disposed between the reaction plates 131a, 132a, 133a, and 134a and the cover plate 136. As such, the air-tightness of passages formed by the channels 131c, 132c, 133c, and 134c can be maintained.

That is, in the present invention, the reaction plates 131a, 132a, 133a, and 134a and the cover plate 136 can be bonded to each other by positioning the gaskets 145 between them, applying the glass frit on the edges thereto, and then baking them.

Since the gaskets 145 are used along with the bonding joints 160 in the present embodiment, the air-tightness of the passages formed by the channels 131c, 132c, 133c, and 134c and the reaction plates 131a, 132a, and 133a and cover plate 136, which are contacting each other, can be effectively maintained and firmly fixed.

Figure 11:
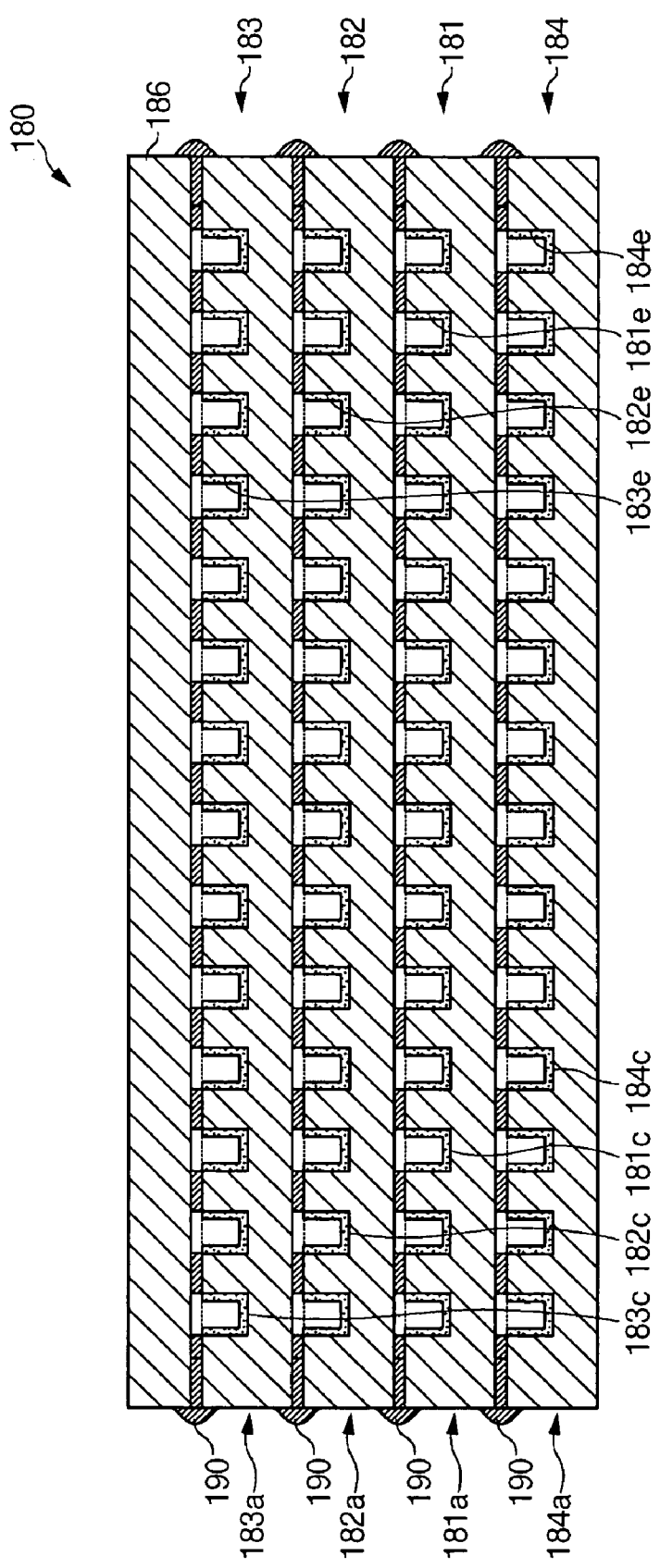
FIG. 11 is a cross-sectional view illustrating a coupled structure of a reformer according to a third embodiment of the present invention.

FIG. 11 is a cross-sectional view illustrating a structure of a reformer according to a third embodiment of the present invention.

Referring to FIG. 11, the reformer 180 according to the present embodiment includes a heat source 181, a reforming reactor 182, a first carbon-monoxide reducer 183, and a second carbon-monoxide reducer 184 which are stacked with each other.

The reformer 180 according to the present embodiment can be constructed by sequentially stacking a second reaction plate 182a and a third reaction plate 183a on a first reaction plate 181a and stacking a fourth reaction plate 184a under the first reaction plate 181a. A cover plate 186 can be coupled onto the third reaction plate 183a and be positioned at the uppermost side of the reformer 180.

Bonding joints 190 for bonding the reaction plates 181a, 182a, 183a, and 184a and the cover plate 186 are made of a sealing material formed at the contact portions therebetween. The sealing material may be composed of a glass frit. That is, the reaction plates 181a, 182a, 183a, and 184a and the cover plate 186 can be bonded to each other by applying glass frit to the portions of the reaction plates 181a, 182a, 183a, and 184a in which the channels 181c, 182c, 183c, and 184c are not formed, and then baking them.

In the present embodiment, by forming the bonding joints 190 on the entire contact portions of the reaction plates 181a, 182a, 183a, and 184a and the cover plate 186, it is possible to more firmly bond these plates 181a, 182a, 183a, and 184a together.

While the present invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer of a fuel cell system comprising:
a plurality of reaction sections comprising a plurality of reaction plates, each of the reaction plates having a first surface and at least one second surface defining a serpentine channel in the first surface, the serpentine channel extending in directions substantially parallel to the first surface;
at least one cover plate adjacent one reaction plate of the reaction plates;
at least one first bonding joint contacting two adjacent reaction plates of the reaction plates and coupling the two adjacent reaction plates to each other; and
at least one second bonding joint contacting the one reaction plate of the reaction plates and the at least one cover plate and coupling the one reaction plate and the at least one cover plate to each other,
wherein the first surfaces of the reaction plates face a common direction,
wherein the at least one first bonding joint contacts the first surface of one of the two adjacent reaction plates, and
wherein at least one bonding joint is a metal layer with a serpentine opening corresponding to the serpentine channel of at least one of the reaction plates contacting the at least one bonding joint.

2. The reformer of claim 1, wherein the reaction sections comprise a plurality of catalyst layers in the channels of the reaction plates.

3. The reformer of claim 2, wherein both the at least one first bonding joint and the at least one second bonding joint comprise metal.

4. The reformer of claim 3, wherein the at least one first bonding joint is in contact portions between the two adjacent reaction plates to bond the two adjacent reaction plates to each other, and the at least one second bonding joint is in contact portions between the one reaction plate and the at least one cover plate to bond the one reaction plate and the at least one cover plate to each other.

5. The reformer of claim 3, wherein at least one of the at least one first bonding joint or the at least one second bonding joint is formed using a brazing method.

6. The reformer of claim 1, wherein the metal of the at least one bonding joint has a melting point lower than that of a material of the reaction plates and a material of the at least one cover plate.

7. The reformer of claim 1, wherein the metal of the at least one bonding joint comprises a material selected from the group consisting of copper, stainless steel, aluminum, nickel, iron, and alloys thereof.

8. The reformer of claim 1, wherein the reaction sections include:
a heat source for generating thermal energy through an oxidation catalytic reaction of a fuel and air; and
a reforming reactor, wherein the reforming reactor is supplied with fuel independent of the heat source and absorbs the thermal energy from the heat source to generate hydrogen gas.

9. The reformer of claim 8, wherein the reforming reactor and the at least one cover plate are respectively stacked on the heat source.

10. The reformer of claim 8, wherein the reaction sections further include a carbon-monoxide reducer for reducing a concentration of carbon monoxide contained in the hydrogen gas.

11. The reformer of claim 1, wherein the at least one first bonding joint has a serpentine opening corresponding to the serpentine channel of the one of the two adjacent reaction plates.

12. The reformer of claim 11, wherein the at least one first bonding joint comprises a brazing metal.

13. The reformer of claim 1, wherein the at least one second bonding joint contacts the first surface of the one reaction plate of the reaction plates and has a serpentine opening corresponding to the serpentine channel of the one reaction plate.

14. The reformer of claim 13, wherein the at least one second bonding joint comprises a brazing metal.

15. A reformer of a fuel cell system comprising:
a plurality of reaction sections comprising a plurality of reaction plates, each of the reaction plates having a first surface and at least one second surface defining a serpentine channel in the first surface, the serpentine channel extending in directions substantially parallel to the first surface, the first surfaces of the reaction plates facing a common direction;
at least one cover plate adjacent one reaction plate of the reaction plates;
at least one first bonding joint comprising a sealing material and coupling two adjacent reaction plates of the reaction plates to each other at respective edges of the two adjacent reaction plates;
at least one second bonding joint comprising a sealing material and coupling the one reaction plate of the reaction plates and the at least one cover plate to each other at respective edges of the one reaction plate and the at least one cover plate;
at least one first gasket between the two adjacent reaction plates and contacting the first surface of one of the two adjacent reaction plates, the at least one first gasket having an opening corresponding to the serpentine channel of the one of the two adjacent reaction plates; and
at least one second gasket between the one reaction plate and the at least one cover plate and contacting the first surface of the one reaction plate, the at least one second gasket having an opening corresponding to the serpentine channel of the one reaction plate.

16. The reformer of claim 15, wherein at least one of the at least one first gasket or the at least one second gasket comprises a material selected from the group consisting of Teflon®, metal, and combinations thereof.

17. The reformer of claim 15, wherein the sealing material of at least one of the at least one first bonding joint or the at least one second bonding joint comprises glass frit.

18. A fuel cell system comprising:
a reformer for generating hydrogen from a fuel containing hydrogen;
at least one electricity generator for generating electric energy through an electrochemical reaction of hydrogen and oxygen;
a fuel supply unit for supplying the fuel to the reformer; and
an oxygen supply unit for supplying oxygen to the reformer and the at least one electricity generator, and
wherein the reformer includes:
a plurality of reaction sections comprising a plurality of reaction plates, each of the reaction plates having a first surface and at least one second surface defining a serpentine channel in the first surface, the serpentine channel extending in directions substantially parallel to the first surface;
at least one cover plate adjacent one reaction plate of the reaction plates;

at least one first bonding joint contacting two adjacent reaction plates of the reaction plates and coupling the two adjacent reaction plates to each other; and at least one second bonding joint contacting the one reaction plate and the at least one cover plate and coupling the one reaction plate and the at least one cover plate to each other, wherein the first surfaces of the reaction plates face a common direction, wherein the at least one first bonding joint contacts the first surface of one of the two adjacent reaction plates, and wherein at least one bonding joint is a metal layer with a serpentine opening corresponding to the serpentine channel of at least one of the reaction plates contacting the at least one bonding joint.

19. The fuel cell system of claim 18, wherein at least one of the at least one first bonding joint or the at least one second bonding joint comprises brazed metal.

* * * * *